United States Patent
Boock et al.

(10) Patent No.: US 8,979,014 B2
(45) Date of Patent: Mar. 17, 2015

(54) MULTILAYER BOARD FOR ACOUSTIC INSULATION

(75) Inventors: Klaus Boock, Timmdorf (DE); Sven Reimer, Hamburg (DE); Lars Hentschel, Gruenendeich (DE)

(73) Assignee: Airbus Operations GmbH, Hamburg (DE)

(*) Notice: Subject to any disclaimer, the term of this patent is extended or adjusted under 35 U.S.C. 154(b) by 23 days.

(21) Appl. No.: 13/164,441

(22) Filed: Jun. 20, 2011

(65) Prior Publication Data

US 2011/0248117 A1   Oct. 13, 2011

Related U.S. Application Data

(63) Continuation of application No. PCT/EP2009/066691, filed on Dec. 9, 2009.

(60) Provisional application No. 61/139,001, filed on Dec. 19, 2008.

(30) Foreign Application Priority Data

Dec. 19, 2008 (DE) .......................... 10 2008 063 923

(51) Int. Cl.
*B64C 1/40* (2006.01)
*B32B 3/12* (2006.01)
(Continued)

(52) U.S. Cl.
CPC ...... *B32B 3/12* (2013.01); *B32B 3/30* (2013.01); *B64C 1/40* (2013.01); *G10K 11/172* (2013.01); *E04B 2001/8461* (2013.01); *E04B 2001/8476* (2013.01); *Y02T 50/46* (2013.01)
USPC ........... 244/1 N; 428/167; 428/116; 181/286; 181/290; 181/293

(58) Field of Classification Search
CPC ............. B64C 1/40; B64C 3/26; B64C 1/12; B64C 1/18; B64C 2001/0072; B64C 3/20; B64C 1/068

USPC ...... 244/1 N, 119, 117 R, 133, 123.1, 123.13, 244/123.5, 123.6; 181/210, 290, 292; 428/116, 136, 167; 52/793.1, 794.1, 52/795.1, 784.14, 787.11, 787.12; 29/428, 29/897.2, 458, 219, 228
See application file for complete search history.

(56) References Cited

U.S. PATENT DOCUMENTS 2,014,694 A * 9/1935 Olschner ...................... 181/292
2,209,825 A * 7/1940 Mazer ............................ 428/167

(Continued)

FOREIGN PATENT DOCUMENTS

DE   2112393 A1   10/1971
DE   1422020 B2   4/1973

(Continued)

OTHER PUBLICATIONS

International Search Report, dated Jan. 27, 2010, for International Application PCT/EP2009/066691.

(Continued)

*Primary Examiner* — Rob Swiatek
*Assistant Examiner* — George Andonyan
(74) *Attorney, Agent, or Firm* — Ingrassia Fisher & Lorenz, P.C.

(57) ABSTRACT

To reduce sound emission and at the same time improve stability, a multilayer board for acoustic insulation is proposed that includes, but is not limited to a core sheet arranged between a first and a second covering layer. At least one of the two covering layers is of a closed design. The core sheet is firmly connected in a planar fashion to the covering layers. The core sheet comprises slits that extend within the core sheet in the direction of the core sheet thickness, which slits reduce the shear stiffness of the board and thus ensure an improved acoustic insulation effect. On both sides the core sheet comprises continuous edge zones, which extend parallel to the covering layers. An aircraft can have an interior lining formed by panels that comprise the multilayer boards in order to provide acoustic insulation.

16 Claims, 5 Drawing Sheets

(51) Int. Cl.
 *B32B 3/30* (2006.01)
 *G10K 11/172* (2006.01)
 *E04B 1/84* (2006.01)

(56) References Cited

U.S. PATENT DOCUMENTS

| | | | |
|---|---|---|---|
| 3,087,570 A | | 4/1963 | Watters et al. |
| 3,748,213 A | | 7/1973 | Kitching et al. |
| 3,795,288 A | * | 3/1974 | Pall ............... 181/224 |
| 3,985,198 A | * | 10/1976 | Kurtze et al. ............ 181/286 |
| 4,111,081 A | | 9/1978 | Hilliard et al. |
| 4,317,503 A | * | 3/1982 | Soderquist et al. ......... 181/290 |
| 4,353,433 A | * | 10/1982 | Mohrenstein-Ertel et al. ............. 181/207 |
| 4,425,981 A | * | 1/1984 | Kiesewetter et al. ........ 181/286 |
| 4,555,433 A | * | 11/1985 | Jablonka et al. ............ 428/166 |
| 5,445,861 A | * | 8/1995 | Newton et al. ............. 428/116 |
| 5,543,198 A | * | 8/1996 | Wilson .................. 428/116 |
| 5,664,397 A | | 9/1997 | Holz |
| 5,715,644 A | * | 2/1998 | Yasui ................. 52/784.14 |
| 6,033,756 A | * | 3/2000 | Handscomb ............... 428/138 |
| 6,065,717 A | | 5/2000 | Boock |
| 6,789,646 B2 | * | 9/2004 | Wang et al. ............... 181/293 |
| 6,815,044 B2 | | 11/2004 | Boock |
| 7,308,965 B2 | * | 12/2007 | Sapoval et al. ............ 181/210 |
| 7,820,268 B2 | * | 10/2010 | Luetgert et al. ............ 428/151 |
| 2003/0006092 A1 | * | 1/2003 | D'Antonio et al. ......... 181/293 |
| 2004/0058131 A1 | * | 3/2004 | Boock .................... 428/167 |
| 2005/0042416 A1 | * | 2/2005 | Blackmon et al. .......... 428/116 |
| 2006/0097945 A1 | * | 5/2006 | McCarville et al. ......... 343/795 |
| 2007/0292658 A1 | * | 12/2007 | Thomas et al. ............ 428/116 |
| 2008/0020176 A1 | * | 1/2008 | Ayle ..................... 428/118 |
| 2008/0248278 A1 | * | 10/2008 | Fisher et al. .............. 428/304.4 |
| 2009/0307996 A1 | | 12/2009 | Berger |
| 2010/0140013 A1 | | 6/2010 | Boock |

FOREIGN PATENT DOCUMENTS

| | | |
|---|---|---|
| DE | 2408028 C3 | 6/1980 |
| DE | 4126781 A1 | 2/1993 |
| DE | 9409118 U1 | 7/1994 |
| DE | 19509972 A1 | 9/1996 |
| DE | 19527081 C1 | 9/1996 |
| DE | 19653850 A1 | 6/1998 |
| DE | 10034990 A1 | 2/2002 |
| DE | 10231791 C1 | 12/2003 |
| DE | 102004026644 A1 | 3/2005 |
| DE | 102005016653 B4 | 10/2008 |
| DE | 102007022616 B3 | 12/2008 |
| EP | 1118547 A2 | 7/2001 |
| FR | 2228916 A1 | 12/1974 |
| GB | 1373063 A | 11/1974 |
| WO | 8504922 A1 | 11/1985 |
| WO | 9900242 A1 | 1/1999 |
| WO | 2007048149 A1 | 5/2007 |
| WO | 2008138840 A1 | 11/2008 |

OTHER PUBLICATIONS

International Preliminary Report on Patentability dated Jun. 21, 2011, for International Application PCT/EP2009/066691.
German Office Action dated Jul. 29, 2009, for German Application No. 10 2008 063 923.0.

* cited by examiner

MULTILAYER BOARD FOR ACOUSTIC INSULATION

CROSS-REFERENCE TO RELATED APPLICATIONS

This application is a continuation of International Application No. PCT/EP2009/066691, filed Dec. 9, 2009, which was published under PCT Article 21(2) and which claims priority to German Patent Application No. 102008063923.0 filed Dec. 19, 2008 and of U.S. Provisional Patent Application No. 61/139,001 filed Dec. 19, 2008, the disclosure of which applications is hereby incorporated herein by reference.

TECHNICAL FIELD

The present invention relates to a multilayer board for acoustic insulation and to a method for producing said board. The invention relates in particular also to an aircraft with an interior lining with panels that comprise multilayer boards according to the invention for acoustic insulation.

BACKGROUND

For the purpose of providing acoustic insulation, panel-shaped components are known that are designed in such a manner that as efficient as possible a reduction in sound emission is achieved. To reduce sound, for example, multilayer boards are used which, to put it in a simplified manner, comprise three layers, wherein the middle layer is designed with a view to acoustic insulation, while the two exterior layers assume other functions, for example the visual finish of a multilayer board used as a wall panel. It is, for example, known to design the middle layer with open slits that have been placed perpendicularly to the face, for example slits that are arranged in a cruciform manner, so that, based on the relatively large slits, sound emission is reduced. However, it has also been shown that this results in impeding the mechanical stability of the multilayer board. In order to provide a multilayer board with increased mechanical stability, a multilayer board is, for example, known from DE 10 2007 022 616 B3, in which the core layer comprises so-called oblique slits, in which multilayer board, when it is subjected to force from the slit side, the oblique slits essentially close up immediately and thus in the case of load application an essentially compact, coherent core layer results that behaves in a manner that is similar to the behavior of a solid core layer with no slits. However, it has been shown that as a result of this the breaking load of the panels is reduced when a load is applied from the direction of the side without slits.

It may be an object of the invention to provide a multilayer board with reduced sound emission and improved stability.

SUMMARY

In an exemplary embodiment a multilayer board for acoustic insulation is provided, which multilayer board comprises a core sheet, a first covering layer and a second covering layer, wherein at least one of the two covering layers is of a closed design. The core sheet is, furthermore, arranged between the first covering layer and the second covering layer and is firmly connected in a planar fashion to the covering layers. Moreover, the core sheet comprises slits. According to the invention it is provided for the slits to extend within the core sheet in the direction of the standard plane of the panel or the core sheet thickness, and for the core sheet on both sides to comprise continuous edge zones that extend parallel to the covering layers.

As a result of this, multilayer boards for acoustic insulation can be provided that comprise improved breaking load behavior, because in those regions of the board, in which during any area load or concentrated load that is experienced the highest tension forces and compression forces can occur, there are no interruptions in the form of slits. In other words, the transition region between the core material and the covering layers is not interrupted by slits, so that in these regions, which are most severely subjected to loads, optimum force transmission can take place. There is a further advantage in the multilayer board according to the invention in that the improved stability is provided irrespective of the direction of the load, in other words irrespective of whether the load is experienced from the front or from the rear. However, at the same time, the slits within the core sheet also ensure that the panel, in other words the multilayer board, provides improved acoustic characteristics when compared to a board with a core sheet without slits.

The acoustic effectiveness is, among other things, due to the fact that in the case of multilayer boards so-called lateral flexural waves can occur in the low frequency range, wherein their velocity is characterized by the overall flexural rigidity of the respective multilayer board. The following phenomena can be distinguished in relation to different frequencies. During an increase in the frequency, a slow transition of the lateral flexural wave to a so-called lateral shear wave occurs, wherein its propagation velocity increases proportionally to the root of the core-sheet shear modulus, irrespective of the frequency. During a further increase in the frequency, a transition from the lateral shear wave to a lateral flexural wave occurs, wherein its propagation velocity is defined by the flexural rigidity of the covering layers of the multilayer boards. In theory it is imaginable for the shear modulus of the core sheet to be selected in such a manner that within the frequency range under consideration the lateral waves remain below the speed of sound in air. In this case the board emits sound only very ineffectively. In practical application different parameters can be varied, for example the thickness of the core sheet, the thickness of the covering layers, their modulus of elasticity, as well as the thickness of the covering layers and of the core sheet. With corresponding attuning of the parameters to each other, a multilayer board providing improved acoustic behavior can be provided. By setting the various parameters the flexural rigidity of the multilayer board relative to a state without external mechanical loads is not influenced. In order to achieve effective acoustic insulation, the shear stiffness of the core sheet must be reduced, because in terms of physical aspects said shear stiffness is directly proportional to the shear modulus of the core sheet. In order to reduce the shear stiffness of the core sheet, the already mentioned slits in the core sheet are provided. However, the slits are at the same time associated with a reduction in the mechanical stiffness and in the breaking load.

By the inventive arrangement of the slits within the core sheet, the effects on the breaking load can be reduced to a minimum, because in this region the so-called neutral phase is arranged, i.e., the region in which, when a load acts on the area, neutralization of the tension forces that are encountered as a result of the flexural moment on the side facing away from the force transmission occurs, and neutralization of the compression forces on the side facing the force transmission occurs. In other words, in the region of the neutral phase the core layer assumes the task of keeping the compression region spaced apart from the tension region, in other words keeping spaced apart the two exterior lateral surfaces of the board.

In a further embodiment the multilayer board is provided for acoustic insulation in an aircraft, in particular in an airplane.

Forming the core sheets and covering layers may take place with the use of materials that are commonly used in aircraft construction, in particular in airplane construction, and in these fields above all in the interior construction of the airplane. This aspect is generally-speaking of fundamental importance in aviation, because all the materials used in an aircraft are subject to special certification procedures. If conventional materials are used in new designs, i.e., if materials are used that have already been qualified, a significantly simpler certification procedure results than would be the case if new materials are used that have not already been approved and certified. In this procedure not only known materials but also known production processes are important, because the latter, too, are taken into account in the certification procedures. In the multilayer board according to the invention, which multilayer board is intended for use in aircraft, it is thus advantageous to use known materials and known production processes in order to keep the certification procedures required for aviation as simple as possible, wherein in this context both time-related and financial aspects play an important role.

It should be pointed out that in the context of the present invention the term "aircraft" refers in particular to airplanes and helicopters.

Furthermore, it should be pointed out that in the context of the present invention the term "slit" is used to describe any elongated or essentially flat recess in a material. In order to form a slit, apart from the shape during the production of the core sheet, various processing methods can also be used, for example milling, drilling, etching, sawing, filing etc. The space, i.e., hollow space, arising in this process means that in this region no force transmission or only very modest force transmission can take place. Consequently, the hollow space either remains as a hollow space or can be filled with some other material, for example a foam material or some other material, with which material force transmission between the slit walls can take place only to a very reduced extent or is completely impossible. Furthermore, it should be pointed out that the depth of the slit extends in the direction of the core sheet thickness. In this arrangement the depth of the slit can extend either perpendicularly to the surface of the core sheet or at an angle to said core sheet.

Depending on the applied processing method or production method of the slits, the slit can be straight in the direction of the depth of the slit, or it can comprise some other sectional shape, for example it can be undulating or angular.

In longitudinal direction, i.e., in the direction of elongation parallel to the surface of the core sheet, the slit can extend in a linear manner or in the manner of a curve or in a linear manner for part of the way. In this arrangement several slits can be arranged so as to be parallel to each other or they can be arranged so as to be distributed across the panel plane in any desired arrangement.

Furthermore, several slits can also be arranged so that they intersect, e.g. in the manner of a grid.

Moreover, it is also possible for the slits not to be continuous along their longitudinal direction, but instead to comprise slit sections that are not connected to each other, in the manner of a dashed line or a dashed-and-dotted line.

Lengthwise the slits may reach right to the edge of the panel, because this makes it easier to form the slits.

If a closed face of the panels is desired, e.g., for design reasons, the slits can also end short of the edge.

In a further embodiment the slits extend across approximately 40 to 90% of the core sheet thickness.

In this way on the one hand a core sheet is provided that comprises the necessary acoustic softness to reduce the emitted sound. On the other hand this also ensures that the core sheet comprises adequate strength beyond the slits so that a panel with adequate mechanical stability when exposed to loads is provided.

In a further embodiment the slits extend over approximately 70% of the core sheet thickness.

Tests have shown that this ratio takes good account of the two different aspects of acoustic insulation and stability.

In a still further embodiment the core sheet comprises a foam material.

In a further embodiment the core sheet comprises a honeycomb structure in which a multitude of tubular or honeycomb-like cells extend in the direction of the core sheet thickness, wherein the cells are separated from each other by cell walls, and the slits are provided in the cell walls.

The honeycomb structure may provide the best possible stability of the core sheet while at the same time being of a relatively lightweight nature so that the multilayer board overall is as light in weight as possible, i.e., the multilayer board can be used in a variety of applications.

The use of honeycomb cores may be particularly suited to fields of application in which component weight is of importance. In this context the field of aviation should be mentioned first and foremost, where the topic of weight assumes particular importance. In the operation of an aircraft, for example an airplane, any reduction in weight provides economic and ecological advantages. As a result of fuel costs that have been rising lately, and as a result of the problematic nature of $CO_2$ emission, which in the meantime is considered to be common sense, the aspect of component weight has been accorded increased importance.

In a further embodiment the core sheet features a multilayer design comprising at least two core layers that by way of at least one intermediate layer are interconnected in a planar fashion, wherein at least one core layer on the side facing another core layer comprises slits that are open on one side.

As a result of the above, forming slits in the core layers is as simple as possible. For example, core layers that are available as board-shaped semi-finished goods can be processed with ease with the use of a saw or a milling machine in that the slits are made from one side, so that on the opposite side of the board a continuous zone arises which when it is later joined to the covering layers provides the best-possible force transmission in the region of the covering layers.

As a result of the multilayer design it is, for example, also possible in a simple manner to form slits in a honeycomb structure, which slits can be made from one side, wherein a further core layer, for example in the form of a further honeycomb structure, is subsequently connected in a planar fashion to the first core layer in such a manner that as a result of this the slits of the first core layer, which slits are open on one side, are quasi covered so that the multilayer board on both sides in the direction of the covering layers in each case comprises a continuous edge zone that is required for force deviation when an external force acts on said board.

In a further embodiment each of the core layers comprises a honeycomb structure in which a multitude of tube-like or honeycomb-like cells extend in the direction of the core sheet thickness, wherein the cells are separated from each other by cell walls, and slits in the cell walls are provided.

For example, the core layers comprise an identical honeycomb structure, and the combs of the honeycomb cores are arranged so as to be aligned with each other.

In an alternative further embodiment the honeycomb cores of the core layers are arranged so as to be offset relative to each other.

In a still further exemplary embodiment the core layers comprise different honeycomb cores.

Consequently, as a result of the different honeycomb widths, depending on the cover layer materials used, it may be possible, for example, to provide surfaces of boards, which surfaces differ in strength.

In a further embodiment for example three core layers are provided, of which the outer core layers have the same honeycomb width, while the middle core layer comprises a honeycomb width that differs from the aforesaid, for example a wider honeycomb width.

In a further embodiment, two core layers on facing sides comprise slits that are open on one side.

In this way it may be possible, for example, to produce in a simple way two core layers that are processed in the same manner in that the slits are made from one side, wherein subsequently the two core layers are arranged with these open sides facing each other so that a core sheet is provided that comprises the necessary continuous edge zones on both sides parallel to the covering layers.

In a further embodiment the core sheet comprises three core layers, wherein the middle core layer comprises continuously open slits.

Since the middle core layer comprises slits it is at first in principle not necessary for the two exterior core layers to also comprise slits; this can have advantages during the production process. By balancing the thicknesses of the exterior core layers relative to the thickness of the middle core layer, different slit proportions of the entire core sheet can be obtained, in other words multilayer boards with different acoustic insulation characteristics can be provided.

In a further embodiment each of the two exterior core layers on the side facing the middle core layer comprises slits that are open on one side.

This may result in further optimization options or adaptation options of the multilayer board as far as its acoustic insulation is concerned.

In a further embodiment the slits in the middle core layer are not continuous over the entire layer thickness.

As a result of the above, the stability of the middle core layer may be improved to the extent that this core layer is easier to handle, because overall it is somewhat sturdier.

In a further embodiment the slits are arranged so as to be offset relative to each other.

Offsetting the slits results on the one hand in the necessary softness of the core sheet, wherein, because of the offset slits, the two adjacent core layers are interconnected to a somewhat lesser extent.

In a further embodiment variant the slits are arranged so as to be aligned with each other.

This makes it possible to achieve improved connection of the adjacent core layers.

For example, the at least one intermediate layer comprises an adhesive layer by means of which the two adjacent core layers are connected.

For example, the aforesaid can be an adhesive layer applied as a film or foil, which in a further process step, for example involving heating, ensures the necessary adhesive effect, i.e., the connection between the two core layers.

The adhesive layer can, for example, be an applied adhesive which connects the two adjacent core layers in a targeted manner by their mutual points of contact.

In a further embodiment the connection of adjacent core layers in the region of the intermediate layer can also take place in that due to external effects the adjacent core layer materials are integrally interconnected, for example as a result of the application of pressure or heat.

In a further embodiment variant the at least one intermediate layer is an attenuation tape that interconnects the core layers by its adhesive effect and that comprises a material that has a mechanically absorbent effect.

An attenuation tape provides an advantage in that it contributes to the acoustic effect by attenuating the amplitudes of the lateral waves.

In a further embodiment variant the at least one intermediate layer is a prepreg. A prepreg may be suitable, for example, with the use of honeycomb cores which in the region of high-performance materials comprise, for example, fiber-reinforced plastic. If a prepreg is used, connection of the core layers can, for example, take place in a curing process in combination with connection to the two covering layers.

The described multilayer boards are particularly suitable for use in aircraft construction in the context of the interior lining of cabins, in particular of passenger cabins. In this field, apart from their space-forming functions, panels also assume aesthetic or visual functions. However, an essential function of panels consists of their acoustic insulation and of their reduced sound emission. For example, the described multilayer boards are used as a lining in the shell region, i.e., between the cabin space and the exterior skin of an aircraft, or also as a space-partitioning element within the aircraft cabin, for example for separating different seating categories or for lining sanitary installations. A principal requirement to be met by a panel used in the region of the cabin partition walls and the cabin lining relates to the reduction in sound propagation in the cabin as a result of reflection. Apart from this, an essential task is to acoustically separate from the cabin the noise sources which when viewed from the cabin are located behind the lining, for example lines situated between the aircraft shell and the cabin panels, or the engines arranged on the wings.

A further embodiment provides for one of the two covering layers to be of an acoustically open design. In this way, for example if a honeycomb design is used in the core sheet, the regions of the core sheet, in other words the cells, can be used to produce a so-called Helmholtz resonator so that the multilayer board can be used not only for acoustic insulation, but also for absorption. Acoustic permeability can, for example, be achieved by perforation of the covering layer.

For example, the previously described multilayer boards can be arranged with their closed covering layer facing in the direction of the cabin, so that from the direction of the cabin space a closed and durable surface is provided. At the same time, due to the sound-absorbent effect there is also absorption of the sound that acts from the exterior on the lining element, i.e., on the multilayer board.

The object of the invention is, in particular, also met by an aircraft comprising a fuselage construction and a cabin formed within the fuselage, which cabin at least in some regions is enclosed by an interior lining formed by panels. According to the invention at least some of the panels comprise a multilayer board for acoustic insulation according to one of the preceding embodiments.

Because of the multilayer boards according to the invention, the aircraft according to the invention comprises improved acoustic insulation so that the quality of staying on board is enhanced for passengers. In this arrangement the multilayer boards according to the invention ensure on the one hand the already mentioned acoustic insulation, and on the other hand also adequate stability and sturdiness of the interior lining. This is of importance against the background of the interior lining being exposed to direct contact with passengers, wherein forces can be experienced which act on the cabin lining panel from the direction of the cabin interior. For example, it frequently happens that passengers use the lining to support themselves, for example when leaving the seat. Often it also happens that passengers seated beside a wall lean against the interior lining when they are tired. Apart from this those loads should also be mentioned which as a rule act temporarily and in a small area in the form of impact loads, for example when an item of baggage bumps against the wall lining or if a passenger falls against the wall lining, and, last but not least, in the case of decompression, for example if a leak in the aircraft fuselage arises. Thus, the interior lining is subjected to various loads that it must withstand, or whose forces it must transfer to structural components. As a result of the design of the multilayer boards that are used for the interior lining, in which boards the acoustically required slits are only arranged in a region that is to a small extent or not at all used for transmitting tension and compression forces, a stable interior lining of the aircraft is provided. The improvement in the acoustic insulation without negatively affecting the stability does, of course, also take into account the aspect of component weight, because improvement of the acoustics is achieved without any increase in component weight; on the contrary, as a result of the slits provided, there is an albeit small reduction in the component weight when compared to the weight of a multilayer board without improved acoustic insulation.

According to the invention, a method for producing a multilayer board for acoustic insulation is also provided.

In an exemplary embodiment of the method, the following steps are provided: first a core sheet is provided by making slits in at least one first core layer, wherein the slits extend from one side in the direction of the core layer thickness in such a manner that the at least one first core layer comprises a continuous edge zone that extends parallel to the area of the core layer, and by arranging an intermediate layer on the side of the core layer with the open slits, and by applying a second core layer to the intermediate layer. Subsequently, the core sheet is arranged between a first covering layer and a second covering layer, wherein at least one of the two covering layers is of a closed design. Thereafter the core sheet is connected to the covering layers, wherein the core sheet is firmly connected in a planar fashion to the covering layers.

The slits within the core sheet result in reduced shear stiffness of the board which results in reduced sound emission, in other words results in improved acoustic insulation. The continuous edge zones on both sides of the core sheet ensure the best-possible force transmission in these regions by interaction with the exterior covering layers. By the edge zones a bond effect can be achieved which corresponds to that of non-slit boards. In other words, despite improved acoustic insulation, the board can withstand similar tension compression forces, or respectively tension and compression forces that are just as severe.

In a further embodiment a method is provided in which, prior to applying the second core sheet, slits are made to the second core sheet, which slits extend from one side in the direction of the core layer thickness in such a manner that the second core layer comprises a continuous edge zone that extends parallel to the core layer area. Thereafter, with its side comprising the open slits the second core layer is placed onto the intermediate layer, wherein the slits are arranged so as to be aligned.

In this manner the slits can be produced in the simplest possible manner, and the multilayer board can be produced economically.

For example, a honeycomb material is used as the core sheet, which honeycomb material as a result of its light weight, while at the same time providing good mechanical loadability, is particularly suitable for interior construction in the field of aviation.

In a further embodiment of the method for production the required materials are purchased already as a semi-finished product. The honeycombs are made by a supplier and are slit already at the supplier. In the variants in which the slits are not made over the full height, the honeycombs are held together in a planar fashion so that they can be handled in the same manner as honeycomb boards without slits. In addition, in order to form the intermediate layer, prepregs comprising a woven glass material or some other fibers are supplied, which prepregs are already impregnated with resin that has not yet cured. The layers supplied in this manner are placed one on top of the other as required. Since the prepreg is so to speak still sticky, all layers can be connected with adequate initial adhesion. Thereafter the entire structure is slid into the autoclave where it is cured at high temperatures. Cutting to size can take place either before or after placement one on top of the other, or after curing.

The invention preferably also relates to the use of a multilayer board according to any one of the above-mentioned embodiments in an aircraft, in particular in an airplane.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
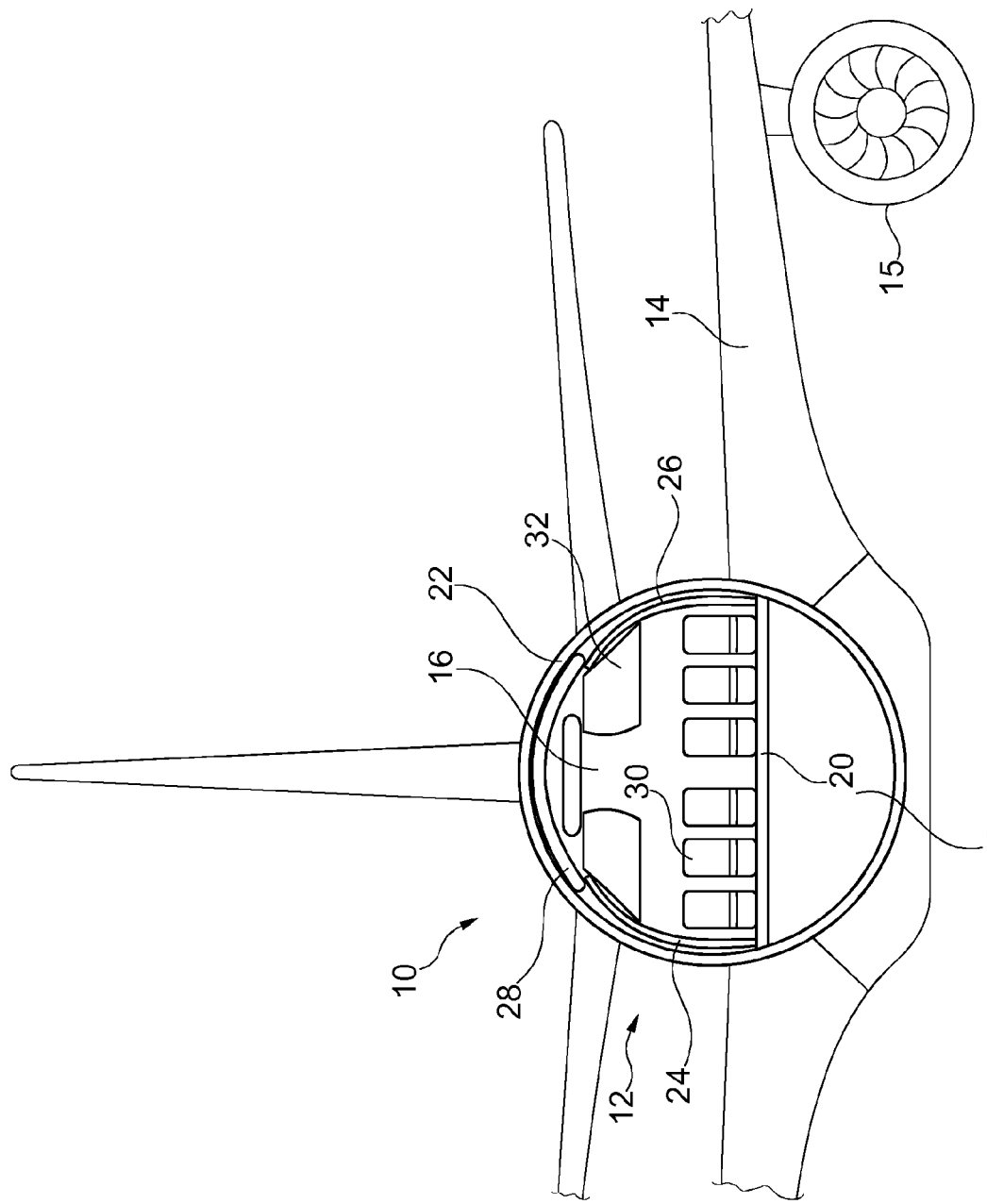
FIG. 1 is a cross-section of an airplane comprising a cabin lining with multilayer boards according to an embodiment of the invention.

FIG. 1 shows an airplane 10 comprising an airplane fuselage 12 as well as two wings 14 that laterally follow on from said airplane fuselage 12, to which wings 14 engines 15 have been affixed, with only one engine 15 being shown. FIG. 1 shows a section view of the airplane fuselage 12 across its longitudinal axis. As shown in the illustration, the airplane fuselage 12 comprises an upper cabin region 16 and a freight region 18 arranged underneath the aforesaid, with the two regions 16 and 18 being separated from each other by a horizontally extending floor 20. The airplane fuselage 12 comprises an essentially circumferential exterior skin 22 of the airplane, which exterior skin 22 is attached to an airplane fuselage structure (for the sake of clarity not shown). The airplane fuselage structure usually comprises a type of load-bearing structure comprising frame elements and stringers, and ensures a sturdy structure into which exterior and interior loads can be transmitted.

The cabin region 16, which is arranged above the floor 20, along the exterior skin 22 comprises lateral cabin linings 24, 26 and an upper cabin lining 28 in the upper region. As shown in the illustration, the elements of the cabin lining 24, 26, and 28 together with the floor 20 form an interior space, i.e., the cabin region 16. For use of the cabin, it is possible, for example, for seats 30 for passengers to be arranged therein. Furthermore, hatracks 32 are provided above the seat rows, which hatracks 32 are used to receive the carry-on baggage of passengers. Furthermore, in the cabin region 16 various supply lines can also be provided, for example an oxygen supply, an electrical supply or ventilation equipment, which for the sake of clarity is not shown in FIG. 1.

The exterior loads, for example wind loads and loads resulting from pressure differentials, which loads act on the fuselage region, are transmitted from the exterior skin 22 to the supporting structure of the airplane fuselage and are thus deflected. For use of the cabin as a passenger cabin it is necessary to provide a cabin with suitable conditions. To this effect the exterior wall construction as a rule also comprises a thermal insulation that is attached to said exterior skin inside the exterior skin. Furthermore, the exterior wall construction is preferably designed to provide acoustic insulation, for example to reduce noise input from the engines 15 to the cabin region 16 to a minimum.

The cabin lining 24, 26, 28 serve to assume both a space-terminating function and to improve the acoustic conditions within the cabin region 16. To this effect the cabin linings 24, 26, and 28 can, for example, be designed so as to provide acoustic insulation and acoustic absorption.

Figure 2:
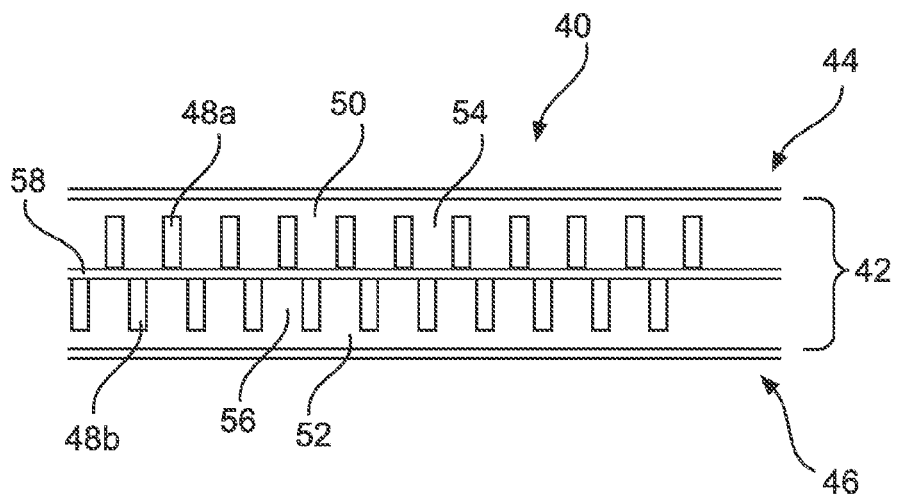
FIG. 2 is a diagrammatic section view of a multilayer board according to an embodiment of the invention.

FIG. 2 shows a cross section of an airplane cabin panel according to the invention in the form of a multilayer board 40. The multilayer board 40 comprises a core sheet 42, a first covering layer 44 and a second covering layer 46. The two covering layers 44, 46 are of a closed design, i. e. they are designed so as to be as far as possible acoustically closed. However, it should be pointed out that according to the invention it would also be adequate if only one of the two covering layers were acoustically closed.

The core sheet 42 is arranged between the first covering layer 44 and the second covering layer 46 and is firmly connected in a planar fashion to the covering layers 44, 46. According to the invention, the core sheet 42 comprises slits 48 which extend within the core sheet 42 in the direction of the core sheet thickness, while the core sheet 42 comprises continuous edge zones 50, 52 that on both sides extend parallel to the covering layers 44, 46.

In the exemplary embodiment shown, the core sheet 42 comprises multiple layers, namely a first layer 54 and a second core layer 56, which layers 54 and 56 are interconnected in a planar fashion by way of an intermediate layer 58.

On the facing sides, i. e. on the sides facing the intermediate layer 58, the core layers 54, 56 comprise open slits 48a, 48b that are arranged so as to be offset relative to each other.

The slits 48a, 48b extend over approximately 70% of the respective thickness of the two core layers 54, 56, i.e., the slits 48 extend over 70% of the core sheet thickness.

In order to interconnect the two core layers 54, 56, the intermediate layer 58 comprises an attenuation tape that interconnects the core layers 54, 56 in an adhesive manner and that comprises a material that has a mechanically absorbent effect.

As a result of the slits 48 in the core sheet 42, the shear stiffness of the multilayer board 40 is reduced, which results in a reduction in the velocity of the flexural wave. In this arrangement the slits 48 are to be formed in such a manner that removal of material occurs so that force transmission between the slit walls is impossible. With the use of an attenuation tape an additional improvement in acoustic insulation is achieved. At the same time, the design of continuous edge zones provides an optimum force region in the transition region between the core sheet and the covering layers, i.e., a region which in terms of stress is subjected to the greatest loads. Since the acoustically effective slits are arranged in the region of the middle of the board, i. e. in the region of the neutral phase during loading across the board area, there is either no influence or only very reduced influence of the mechanical stability in terms of the loads acting on the area. This will be demonstrated with reference to test results shown in FIG. 6 and FIG. 7.

Figure 4:
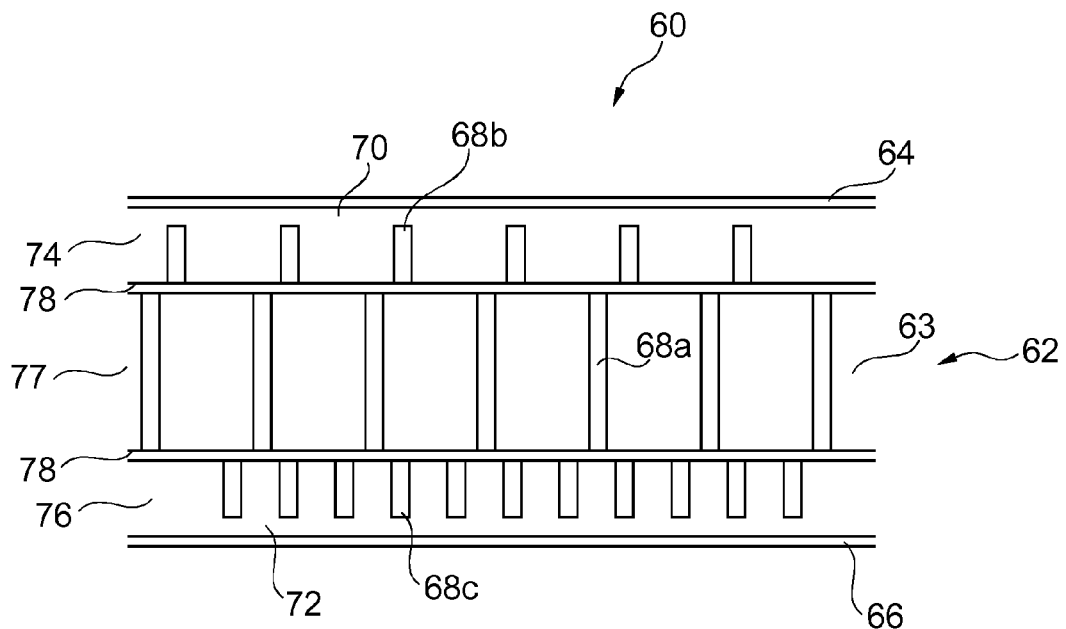
FIG. 4 is a sectional view of a further embodiment.

FIG. 4 shows a variant of a multilayer board 60 in which a core sheet 62 is arranged between two covering layers 64, 66 and is rigidly interconnected in a planar fashion with the covering layers. To this effect, continuous edge zones 70, 72 are provided which extend in the core sheet 62 on both sides parallel to the covering layers 64, 66. The core sheet 62 comprises three layers, namely a first layer 74 and a second core layer 76, between which layers 74 and 76 a middle, third, core layer 77 is arranged. The core layers 74, 76, 77 are interconnected in a planar fashion by means of an intermediate layer 78. In order to achieve additional improvement in the acoustic insulation of the boards, in each case the intermediate layer 78 is designed as an attenuation tape.

In the exemplary embodiment shown, the middle core layer 77 comprises continuous open slits 68a. At their sides facing the core layer 77 the other two core layers 74, 76 comprise slits 68b, 68c that are open on one side. In this arrangement the slits can be arranged so as to be offset relative to each other, as shown. However, the slits can also be arranged so as to be aligned with each other. In FIG. 4 the slits 68b of the first core layer 74 are spaced apart differently from the slits 68c of the second core layer 76. According to the invention, the slits can also comprise identical or completely different spacing, even among themselves.

It should also be pointed out that for the sake of simplicity the slits are shown in relatively wide widths. The slits can, of course, also be designed so as to be narrower or wider.

Figure 5:
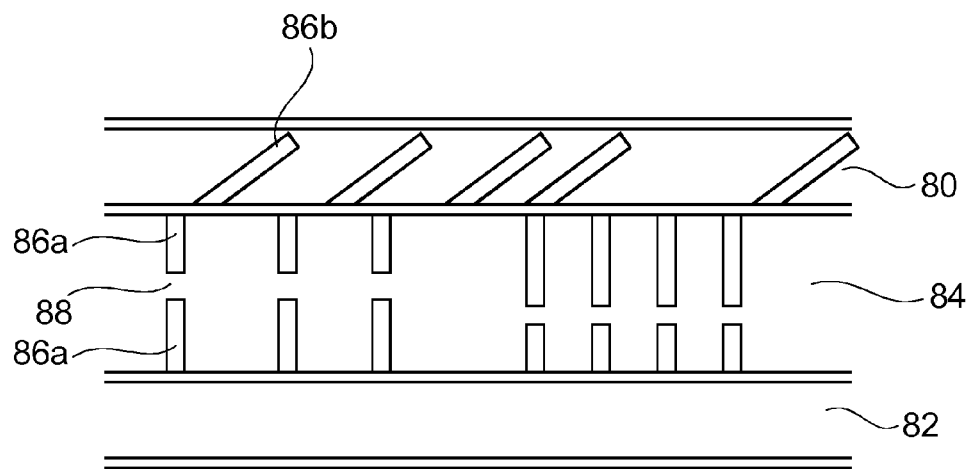
FIG. 5 is a sectional view of a further embodiment.

FIG. 5 shows a further embodiment which is intended to point out various different exemplary embodiment options of the slits. As shown in the diagram, the multilayer board may comprise a first core layer 80, a second core layer 82 and a middle core layer 84. The middle core layer 84 may comprise slits 86a which are, however, not continuous, so that in each case some of the core layer remains as a web 88. In this arrangement the remaining web 88 can be arranged differently between the slit halves, e.g., in the middle or offset. The web 88 contributes to the stability of the board, in particular in the case of long slit-lengths, thus facilitating handling during manufacture of the boards.

The first core layer 80 also comprises slits 86b, which are, for example, arranged obliquely, in other words at an angle to the surface normal. The second core layer 82 does not comprise any slits and is thinner when compared to the first core layer 80. The slits 86b of the first core layer 80 and the slits 86a of the middle core layer 84 are spaced apart differently, with some being arranged so as to be offset relative to each other and some being arranged so as to be aligned to each other.

Figure 6:
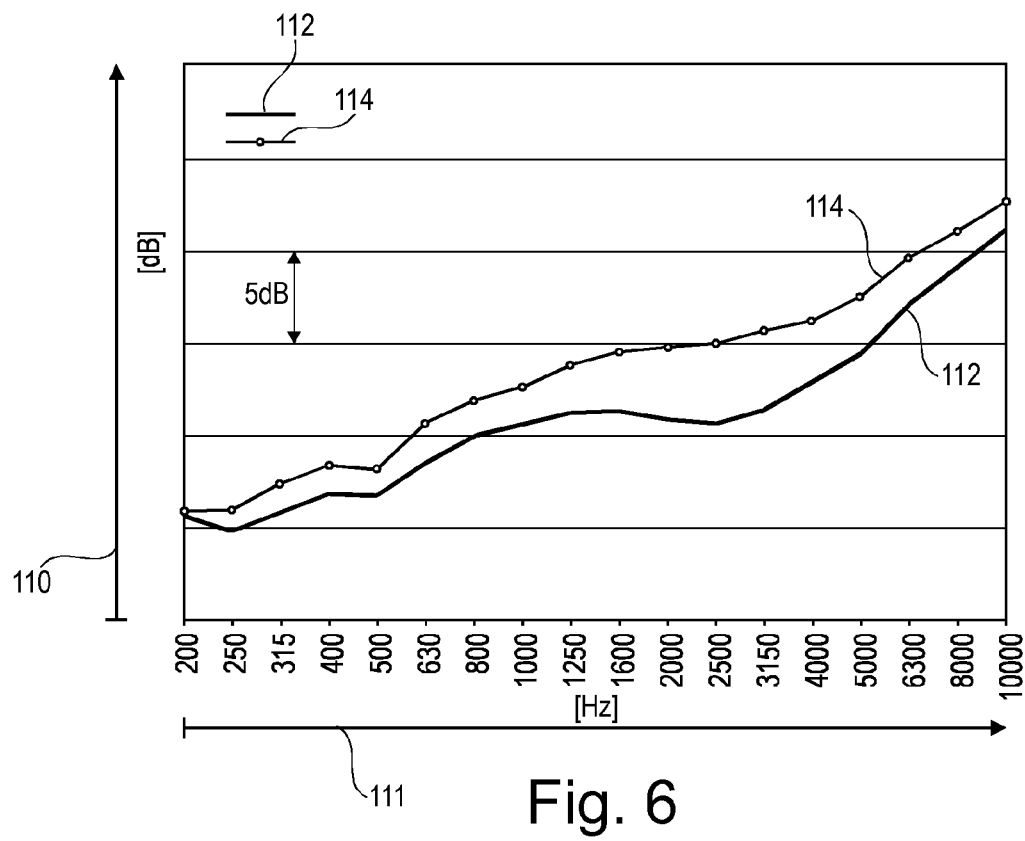
FIG. 6 is a comparison of the extent of acoustic insulation provided by a honeycomb board comprising slits according to an embodiment of the invention and a honeycomb board comprising no slits.

FIG. 6 shows the experimentally determined extent of acoustic insulation of a multilayer board according to the invention with slits within the core sheet when compared to a reference board without slits. In FIG. 6 the vertical axis shows the extent 110 of acoustic insulation while the horizontal axis shows the frequency 111. The values determined in relation to a board without slits are shown in a first curve 112, while the values of a board according to the invention are shown in a second curve 114. The diagram shows that the extent of acoustic insulation is improved as a result of the slits, in particular in the region of the so-called coincidence, in FIG. 6 in the frequency range from 1.5 kHz to 5 kHz, because the reduced velocity of the shear wave of the multilayer board results in reduced sound emission and thus in improved acoustic insulation.

Figure 7:
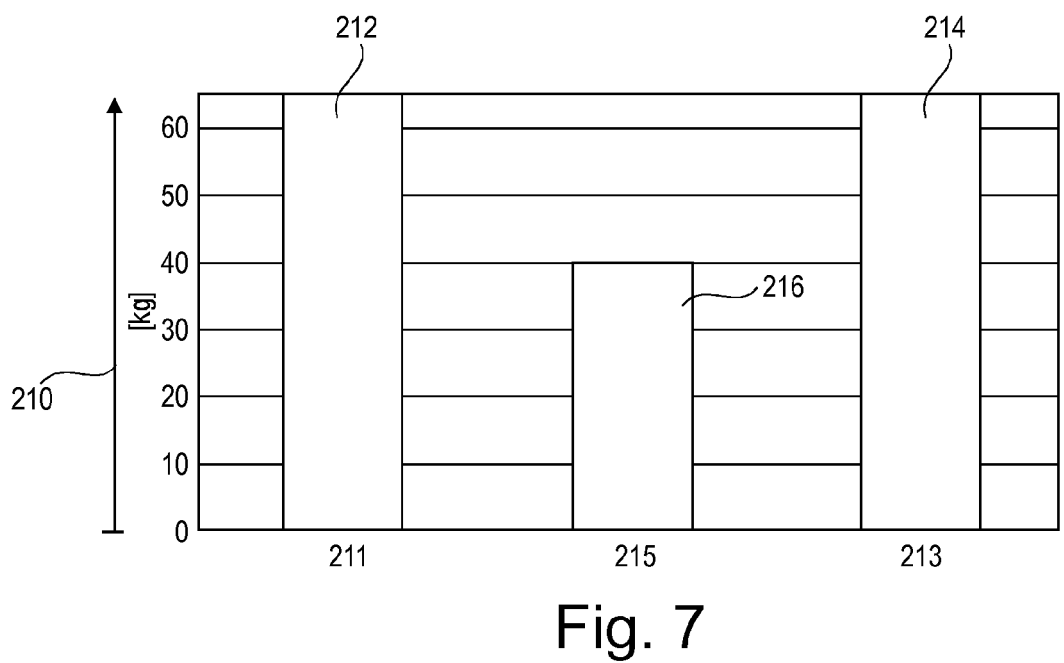
FIG. 7 is a comparison of the breaking resistance of a board without slits, a board comprising conventional slits, and a multilayer board according to an embodiment of the invention.

However, the multilayer board according to the invention is not merely characterized by improved acoustic insulation, but also by improved breaking resistance when compared to the board comprising slits, which board was mentioned in the introduction, as shown in FIG. 7. FIG. 7 shows the results of a breaking test in which the load on various boards was gradually increased until failure of the boards occurred or until the determined maximum load was reached. To this effect FIG. 7 shows three different boards, arranged side-by-side along the horizontal axis, while the loads 210 applied to them are shown in the vertical axis.

FIG. 7 shows that in a board 211 without slits considerable loads have been applied, as shown by the bar graph 212. At the value achieved the board did not break. Compared to this, when a multilayer board 213 according to the invention was subjected to loads, which multilayer board 213 according to the invention in FIG. 6 was already compared to a conventional board in order to determine its acoustic effectiveness, a comparable value was achieved. In other words, the multilayer board 213 according to the invention withstood the determined maximum load without damage, just like the reference board 211 without slits did, which is shown in the bar graph 214. In comparison to the above, a comparison test involving a honeycomb board 215 comprising conventionally arranged slits, in which honeycomb board 215 one core sheet comprises slits that are open on one side, failure in the form of a so-called rift fracture occurred, wherein the value shown in the bar graph 216 is significantly lower than the values shown in the two other bar graphs 212, 214.

In terms of its mechanical characteristics, the multilayer board according to the invention is thus suitable for the same fields of application as is a board without slits. However, at the same time the multilayer board 40 according to the invention provides an improved extent of acoustic insulation, so that with its use, in the form of panels of the interior lining, in the aircraft shown in FIG. 1, improved quality of travel relating to the acoustic conditions is obtained.

Figure 3:
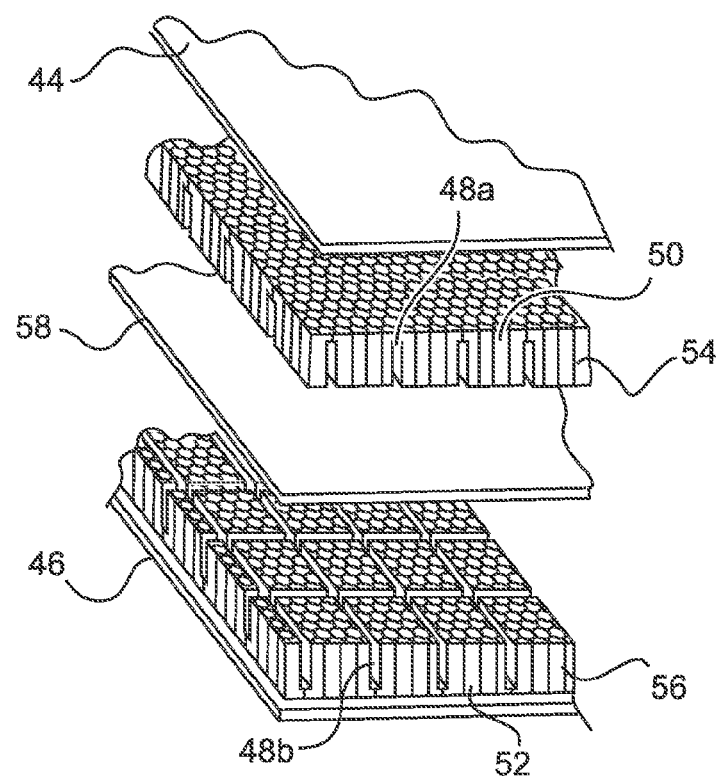
FIG. 3 is an isometric disaggregated component view of the multilayer board of FIG. 2.
Figure 8:
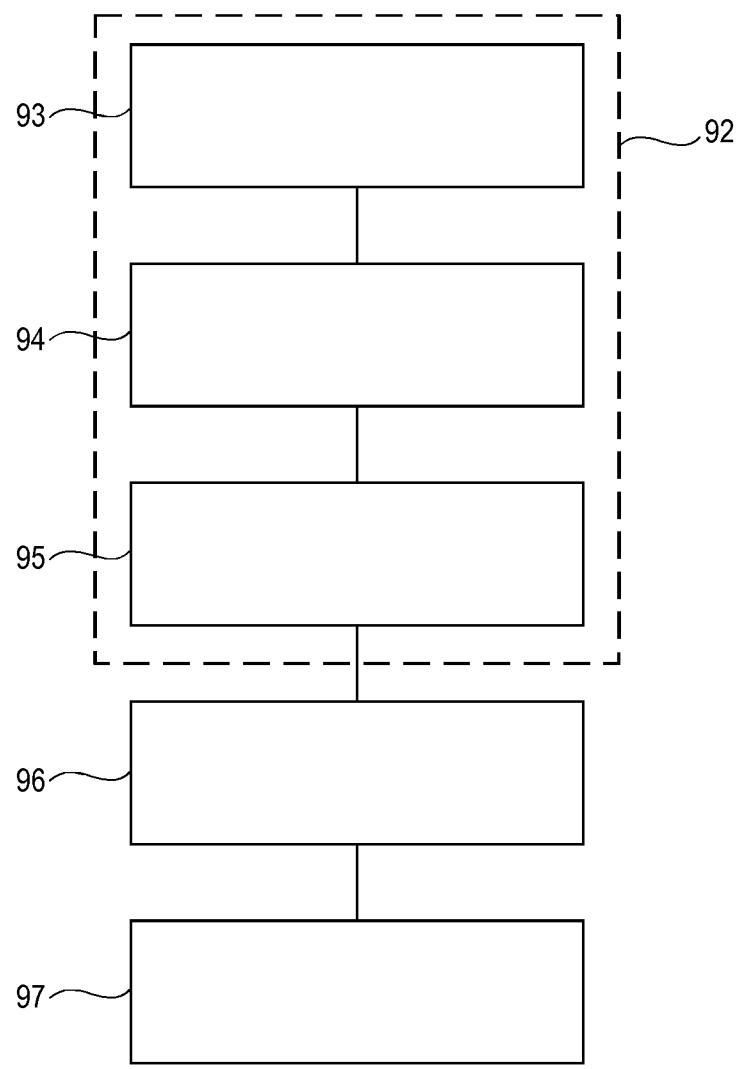
FIG. 8 shows essential method-related steps in the production of a multilayer board according to an embodiment of the invention.

FIG. 8 diagrammatically shows the essential steps in the production of a multilayer board according to the invention according to FIG. 3. In a first process-related segment 92 a core sheet is provided. To this effect, slits are at first made in at least one first core layer 93, wherein the slits extend from one side in the direction of the core layer thickness in such a manner that the at least one first core layer comprises a continuous edge zone that extends parallel to the core layer surface. Thereafter an intermediate layer is arranged 94 on the side of the first core layer with the open slits. Subsequently, a second core layer is placed 95 on the intermediate layer. In the case of more than two core layers, correspondingly, further steps take place; i.e., arranging a further intermediate layer and placing a further core layer. Thereafter, the core layer is arranged 96 between a first covering layer and a second covering layer, wherein at least one of the two covering layers is of a closed design. Subsequently, the core sheet is firmly connected 97 in a planar fashion to the covering layers.

In a further exemplary embodiment of production, the required materials are already supplied as semi-finished products. For example, the honeycombs are manufactured by a supplier and already comprise slits. In those variants where the slits are not made over the full height, the honeycombs are held together in a planar fashion so that they can be handled in the same manner as honeycomb boards without slits. In addition, for example, prepreg goods are supplied that comprise a woven glass fabric or some other fibers and that are already impregnated with resin, wherein the resin has not yet cured. The layers supplied in this manner are placed one on top of the other as required. Since the prepreg is so to speak still sticky, all the layers can be connected with adequate initial adhesion. Thereafter the entire structure is slid into the autoclave where it is cured at high temperatures. Cutting to size can take place either before or after placement one on top of the other, or after curing.

Subsequently, the board-shaped material can be matched to the precise dimensions, e.g., it can be cut to size or sawn.

It should be pointed out those characteristics which have been described with reference to one of the above exemplary embodiments or to a design can also be used in combination with other characteristics of other exemplary embodiments described above. In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A multilayer board for acoustic insulation for a panel lining an interior space, comprising
    a core sheet comprising:
    at least two core layers, with each core layer comprising:
    a honeycomb structure in which a plurality of cells extend in a direction of a core sheet thickness, the plurality of cells are separated by cell walls;
    slits in the cell walls that extend within the core layer along a longitudinal axis in the direction of the core sheet thickness, the slits arranged so as to divide the plurality of cells of the honeycomb structure into subpluralities of cells, and the slits extend to a respective substantially continuous edge region of the core layer, the substantially continuous edge region devoid of the slits; and
    a first covering layer;
    a second covering layer, and
    an intermediate layer,
    wherein at least one of the first covering layer and the second covering layer is a closed design,
    wherein the core sheet is arranged between the first covering layer and the second covering layer and firmly connected in a planar fashion to the first covering layer and the second covering layer, and the slits are open slits, and
    wherein the substantially continuous edge regions on both sides of the core sheet extend parallel to the first covering layer and the second covering layer, with the substantially continuous edge region of each core layer each firmly connected to a respective one of the first cover layer and the second cover layer, and the longitudinal axis of the slits is transverse to the first covering layer.

2. The multilayer board of claim 1, wherein the slits extend over approximately 70% of the core sheet thickness and the slits are arranged in a grid-like pattern.

3. The multilayer board of claim 1, wherein the at least two core layers are each interconnected in a planar fashion with the intermediate layer.

4. The multilayer board of claim 1, wherein the slits are offset relative to each other.

5. The multilayer board of claim 1, wherein the slits are aligned with each other.

6. The multilayer board of claim 3, wherein the core sheet comprises three core layers, wherein a middle core layer of the three core layers comprises substantially continuous open slits.

7. The multilayer board of claim 3, wherein the intermediate layer comprises an adhesive layer connecting two adjacent core layers.

8. The multilayer board of claim 3, wherein the intermediate layer is an attenuation tape that interconnects adjacent core layers by an adhesive effect and further comprises a material that has a mechanically absorbent effect.

9. The multilayer board of claim 3, wherein the intermediate layer is a prepreg.

10. The multilayer board of claim 6, wherein at sides facing the middle core layer, the other two core layers of the three core layers comprise the slits that are open on one side.

11. An aircraft, comprising:
a fuselage; and
a cabin formed within the fuselage, the cabin enclosed by an interior lining formed by panels in at least in some regions,
wherein at least some of the panels of the interior lining of the cabin comprise a multilayer board for acoustic insulation, the multilayer board comprising:
a core sheet having a first side and a second side, the core sheet comprising:
at least two core layers, with each core layer comprising:
a honeycomb structure in which a plurality of cells extend in a direction of a core sheet thickness, the plurality of cells are separated by cell walls, and slits are provided in the cell walls;
slits that extend within the core layer along a longitudinal axis in the direction of the core sheet thickness, and the slits extend to a respective substantially continuous edge region of the core layer, the substantially continuous edge region devoid of the slits; and
a first covering layer;
a second covering layer, and
an intermediate layer
wherein at least one of the first covering layer and the second covering layer is a closed design and the slits are open slits,
wherein the core sheet is arranged between the first covering layer and the second covering layer and firmly connected in a planar fashion to the first covering layer and the second covering layer, and
wherein the substantially continuous edge regions on both the first side and the second side of the core sheet extend parallel to the first covering layer and the second covering layer, with the substantially continuous edge region of each core layer each firmly connected to a respective one of the first cover layer and the second cover layer, and the longitudinal axis of the slits is transverse to the first covering layer.

12. The aircraft of claim 11, wherein the slits extend over approximately 70% of the core sheet thickness.

13. The aircraft of claim 11, wherein the at least two core layers are interconnected in a planar fashion with the intermediate layer.

14. The aircraft of claim 13, wherein the core sheet comprises three core layers, wherein a middle core layer of the three core layers comprises substantially continuous open slits.

15. The aircraft of claim 14, wherein at sides facing the middle core layer, the other two core layers of the three core layers comprise the slits that are open on one side.

16. A method for producing a multilayer board for acoustic insulation for a panel lining an interior space, comprising:
providing a core sheet with slits in a first core layer, the slits extend from one side along a longitudinal axis in a direction of a core layer thickness in such a manner that the first core layer comprises a continuous edge region devoid of slits that extends parallel to an area of the first core layer;
arranging an intermediate layer on the side of the first core layer with open slits; and
applying a second core layer of the core sheet to the intermediate layer, the second core layer including slits that extend from one side of the second core layer along a longitudinal axis in a direction of a core layer thickness in such a manner that the second core layer has a continuous edge region devoid of slits that extends parallel to an area of the second core layer;
arranging the core sheet between a first covering layer and a second covering layer, wherein at least one of the two covering layers is of a closed design; and
connecting the continuous edge region of the first core layer of the core sheet to the first covering layer and connecting the continuous edge region of the second core layer of the core sheet to the second covering layer, the core sheet firmly connected in a planar fashion to the first covering layer and the second covering layer,
wherein the core sheet comprises a honeycomb structure in which a plurality of cells extending in the direction of the core layer thickness, the plurality of cells are separated from each other by cell walls, and the slits are provided in the cell walls, with the longitudinal axes of the slits extending transversely to the first covering layer, and the slits are open slits.

* * * * *